United States Patent [19]
Adam

[11] Patent Number: 6,030,420
[45] Date of Patent: Feb. 29, 2000

[54] DYE MIXTURES AND THE USE THEREOF

[75] Inventor: Jean-Marie Adam, Rosenau, France

[73] Assignee: Ciba Specialty Chemicals Corporation, Tarrytown, N.Y.

[21] Appl. No.: 09/207,540

[22] Filed: Dec. 8, 1998

[30] Foreign Application Priority Data

Dec. 10, 1997  [EP]  European Pat. Off. .............. 97810963

[51] Int. Cl.$^7$ ...................................................... C09B 1/34
[52] U.S. Cl. ............................... 8/641; 8/679; 8/638-613; 8/924
[58] Field of Search ................................. 8/679, 638–643, 8/924

[56] References Cited

U.S. PATENT DOCUMENTS

| | | | |
|---|---|---|---|
| 4,146,363 | 3/1979 | Harms et al. .................................. | 8/39 |
| 4,402,704 | 9/1983 | Raisin et al. ................................. | 8/641 |
| 4,537,598 | 8/1985 | Schaetzer et al. ........................... | 8/641 |
| 4,579,561 | 4/1986 | Rowe et al. ................................. | 8/641 |
| 4,773,914 | 9/1988 | Harms et al. ................................ | 8/641 |
| 5,131,919 | 7/1992 | Mäusezahl .................................. | 8/643 |
| 5,630,851 | 5/1997 | Jordine et al. .............................. | 8/641 |

FOREIGN PATENT DOCUMENTS

| | | |
|---|---|---|
| 0651028 | 5/1995 | European Pat. Off. . |
| 1568928 | 6/1980 | United Kingdom . |
| 2236542 | 4/1991 | United Kingdom . |

OTHER PUBLICATIONS

Chem. Abstr., vol. 100, No. 6, (1984), 35774r of JP 58125755 Jul. 26, 1983.
Derwent Abstr. 83–750923 of JP 58–125758 Dec. 1983.
Derwent Abstr. 83–750920/35 of JP 58125755 Jul. 2, 1983.

*Primary Examiner*—Margaret Einsmann
*Attorney, Agent, or Firm*—Kevin T. Mansfield

[57] ABSTRACT

The invention relates to dye mixtures comprising at least one dye of formula (1)

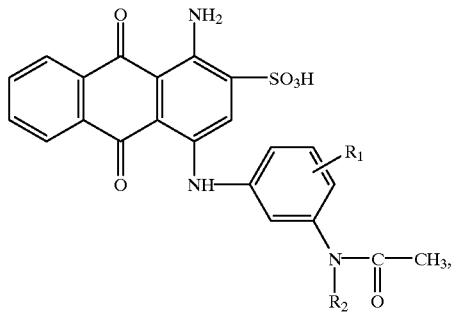

wherein $R_1$ is hydrogen, $C_1$–$C_4$alkyl or $C_1$–$C_4$alkoxy and $R_2$ is hydrogen or $C_1$–$C_4$alkyl, together with at least one dye of formula (2)

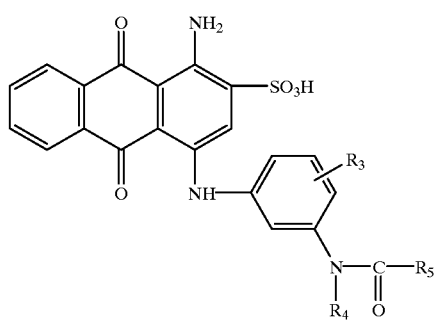

wherein $R_3$ is hydrogen, $C_1$–$C_4$alkyl or $C_1$–$C_4$alkoxy, $R_4$ is hydrogen or $C_1$–$C_4$alkyl and $R_5$ is $C_2$–$C_6$alkyl uninterrupted or interrupted by oxygen, with the proviso that $R_1$ is not methyl when $R_2$, $R_3$ and $R_4$ are hydrogen and $R_5$ is ethyl.

The dye mixtures are suitable for dyeing or printing natural or synthetic polyamide fibre materials, especially in combination with other dyes and especially from short liquors. The dye mixture is distinguished by generally good properties, especially good uptake and good solubility.

20 Claims, No Drawings

DYE MIXTURES AND THE USE THEREOF

The present invention relates to mixtures of blue anthraquinone dyes that are suitable for dyeing natural or synthetic textile polyamide fibre materials from an aqueous bath, that have very good fastness properties, especially light fastness, and that, especially in combination with other dyes, exhibit good exhaustion, especially from short liquors.

The present invention relates also to a method for the trichromatic dyeing or printing of natural or synthetic polyamide fibre materials using those mixtures of blue anthraquinone dyes. The resulting dyeings are distinguished especially by uniform colour build-up together with constancy of shade in different concentrations.

The present invention accordingly relates to dye mixtures comprising at least one dye of formula (1)

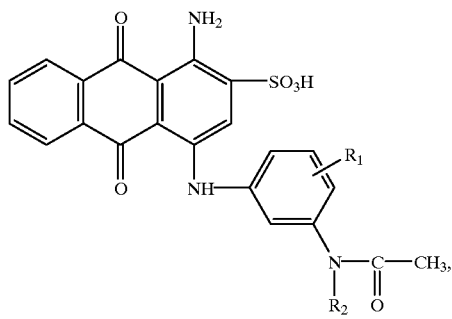

(1)

wherein
R$_1$ is hydrogen, C$_1$–C$_4$alkyl or C$_1$–C$_4$alkoxy and
R$_2$ is hydrogen or C$_1$–C$_4$alkyl,
together with at least one dye of formula (2)

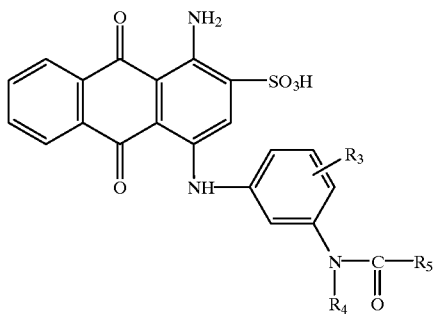

(2)

wherein
R$_3$ is hydrogen, C$_1$–C$_4$alkyl or C$_1$–C$_4$alkoxy,
R$_4$ is hydrogen or C$_1$–C$_4$alkyl and
R$_5$ is C$_2$–C$_6$alkyl uninterrupted or interrupted by oxygen, with the proviso that R$_1$ is not methyl when R$_2$, R$_3$ and R$_4$ are hydrogen and R$_5$ is ethyl.

Examples of C$_1$–C$_4$alkyl that come into consideration for R$_1$, R$_2$, R$_3$ and R$_4$, each independently of the others, are methyl, ethyl, propyl, isopropyl, butyl, sec-butyl, tert-butyl and isobutyl, especially methyl and ethyl, preferably methyl.

Examples of C$_1$–C$_4$alkoxy that come into consideration for R$_1$ and R$_3$, each independently of the other, are methoxy, ethoxy, propoxy, isopropoxy, butoxy and isobutoxy, especially methoxy and ethoxy, preferably methoxy.

Examples of C$_2$–C$_6$alkyl that come into consideration for R$_5$ are ethyl, propyl, isopropyl, butyl, sec-butyl, tert-butyl, isobutyl, pentyl and hexyl. The alkyl radicals mentioned may be interrupted by oxygen. As examples of such alkyl radicals interrupted by oxygen there may be mentioned the methoxymethyl, ethoxymethyl and 2-methoxyethyl radicals, especially the methoxymethyl radical.

R$_1$ is preferably hydrogen, methyl or methoxy, especially hydrogen.

R$_2$ is preferably hydrogen, methyl or ethyl, especially hydrogen.

R$_3$ is preferably hydrogen, methyl or methoxy, especially hydrogen.

R$_4$ is preferably hydrogen, methyl or ethyl, especially hydrogen.

R$_5$ is preferably C$_2$–C$_4$alkyl, especially propyl or ethyl, more especially ethyl.

Preference is given to dye mixtures wherein
R$_1$ and R$_3$ are each independently of the other hydrogen, methyl or methoxy,
R$_2$ and R$_4$ are hydrogen, and
R$_5$ is C$_2$–C$_4$alkyl.

Special preference is given to dye mixtures wherein
R$_1$, R$_2$, R$_3$ and R$_4$ are hydrogen, and
R$_5$ is ethyl.

The dye mixtures according to the invention preferably comprise from 5 to 95% by weight, especially from 20 to 80% by weight, more especially from 40 to 60% by weight, of a dye of formula (1), based on the total amount of the dyes of formulae (1) and (2).

The anthraquinone dyes of formulae (1) and (2) are known or can be prepared analogously to known dyes. For example, the dyes of formulae (1) and (2) can be obtained by reacting 1-amino-4-bromoanthraquinone-2-sulfonic acid with a compound of formula (11) or (12)

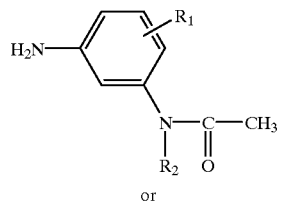

(11)

or

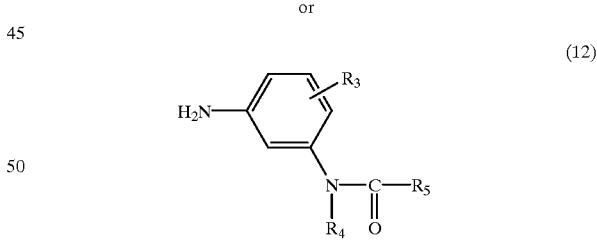

(12)

wherein R$_1$, R$_2$, R$_3$, R$_4$ and R$_5$ are as defined above. The reaction is preferably carried out in aqueous solution at a temperature of, for example, from 50 to 100° C., especially from 65 to 85° C., in the presence of a base, for example sodium hydrogen carbonate, and a catalyst, for example a mixture of copper and copper chloride.

The dye mixtures according to the invention can be prepared, for example, by mixing the individual dyes together. The mixing process is carried out, for example, in a suitable mill, for example a ball mill or pin mill, or in a kneader or mixer.

The dye mixtures can also be prepared, for example, by spray-drying the aqueous dye mixtures.

The dye mixtures according to the invention can also be prepared by co-synthesis, for example by the simultaneous reaction of 1-amino-4-bromoanthraquinone-2-sulfonic acid with a compound of formula (11) and with a compound of formula (12) in the manner indicated above.

The invention relates also to a method for dyeing and printing natural or synthetic polyamide fibre materials with the dye mixture according to the invention, which comprises at least one dye of formula (1) and at least one dye of formula (2). Suitable synthetic polyamide fibre materials are, for example, polyamide 6.6 or polyamide 6 fibre materials and suitable natural polyamide fibre materials are, for example, wool. Customary dyeing and printing methods are used for the dyeing and printing.

The textile material to be dyed or printed may be in a variety of processed forms, for example, fibres, yarn, fabric or knitted goods, and especially in the form of carpets.

The dye mixtures according to the invention are also suitable for dyeing from short liquors, such as, for example, in continuous dyeing methods or in batchwise or continuous foam dyeing methods.

The dye mixtures according to the invention are distinguished by generally good properties for example good solubility, stability in cold solution and good uptake, and especially by good combinability with other dyes as well as by uniform good exhaustion onto a variety of fibre materials.

The dyeings or prints produced according to the method of the invention using the dye mixtures of the invention are distinguished by good allround properties, especially by good fastness to rubbing, to wetting, to wet rubbing and to light, and especially by good fastness to ozone.

In the dye mixtures according to the invention the dyes of formulae (1) and (2) are present either in the form of their free sulfonic acid or, preferably, in the form of the salts thereof, for example in the form of the alkali, alkaline earth or ammonium salts or in the form of salts of an organic amine. Examples include the sodium, lithium and ammonium salts and the salt of triethanolamine.

The dye mixtures generally comprise further additives, for example sodium chloride, dispersants or dextrin.

The dye liquors or print pastes may also comprise further additives, for example wetting agents, antifoams, levelling agents or agents that influence the properties of the textile material, for example softeners, additives for flame-resistance finishes or dirt-, water- and oil-repellants, as well as water-softeners and natural or synthetic thickeners, for example alginates and cellulose ethers.

The dye mixtures according to the invention are suitable especially for dyeing and printing in combination with other dyes and especially for dyeing and printing according to the trichromatic principle. Trichromatism is to be understood as being the additive colour-mixing of suitably selected yellow or orange, red and blue dyes in the amounts required to obtain the desired shade.

The invention relates also to a method for the tdichromatic dyeing or printing of natural or synthetic polyamide fibre materials using the mixtures according to the invention, comprising at least one dye of formula (1) and at least one dye of formula (2), together with at least one red dye and at least one yellow or orange dye, the mixtures according to the invention comprising at least one dye of formula (1) and at least one dye of formula (2) being subject especially to the above-mentioned preferences.

There is preferably used as red dye in the method for trichromatic dyeing or printing according to the invention at least one dye of formula (3)

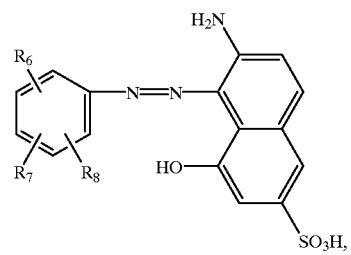

wherein
$R_6$ is hydrogen; halogen; unsubstituted or substituted $C_1$–$C_8$alkyl; phenylsulfonyl or phenoxysulfonyl each unsubstituted or substituted in the phenyl ring by $C_1$–$C_4$alkyl; cyclohexyloxycarbonylamino; $C_2$–$C_4$alkanoylamino; benzoylamino unsubstituted or halo-substituted in the phenyl ring; or

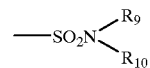

wherein $R_9$ is $C_1$–$C_8$alkyl, or phenyl or cyclohexyl each unsubstituted or substituted by $C_1$–$C_4$alkyl, and $R_{10}$ is hydrogen or $C_1$–$C_8$alkyl, or the radicals $R_9$ and $R_{10}$ together with the nitrogen atom bonding them form an azepinyl ring,
$R_7$ is hydrogen, halogen, $C_1$–$C_8$alkyl or $C_2$–$C_4$alkanoylamino and
$R_8$ is hydrogen, halogen or unsubstituted or substituted phenoxy.

$R_6$, $R_7$ and $R_8$ as halogen are each independently of the others, for example, fluorine, chlorine or bromine, preferably chlorine or bromine.

Examples of $C_1$–$C_8$alkyl that come into consideration for $R_6$, $R_7$, $R_9$ and $R_{10}$, each independently of the others, are methyl, ethyl, propyl, isopropyl, butyl, isobutyl, sec-butyl, tert-butyl, pentyl, hexyl, heptyl and octyl. $R_6$ as $C_1$–$C_8$alkyl may be substituted, for example, by halogen, for example chlorine or fluorine, especially fluorine. The trifluoromethyl radical may be mentioned by way of example.

Examples of $C_2$–$C_4$alkanoylamino that come into consideration for $R_6$ and $R_7$, each independently of the other, are acetylamino, propionylamino and butyrylamino.

The radical $R_8$ as phenoxy is unsubstituted or, for example, substituted in the phenyl ring by $C_1$–$C_4$alkyl, for example methyl or ethyl; $C_1$–$C_4$alkoxy, for example methoxy or ethoxy; $C_2$–$C_4$alkanoylamino, for example acetylamino or propionylamino; hydroxy; sulfo or halogen, for example fluorine, chlorine or bromine.

There is especially used as red dye in the method for trichromatic dyeing or printing according to the invention at least one dye of formula (3) wherein $R_6$ is halogen, unsubstituted or halo-substituted $C_1$–$C_4$alkyl, preferably trifluoromethyl, or 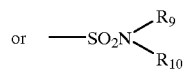

wherein $R_9$ is $C_1$–$C_4$alkyl, phenyl or cyclohexyl, preferably cyclohexyl, and
$R_{10}$ is hydrogen or $C_1$–$C_4$alkyl, preferably methyl or ethyl, especially methyl, or the radicals $R_9$ and $R_{10}$ together with the nitrogen atom bonding them form an azepinyl ring, $R_7$ is hydrogen, halogen or $C_2$–$C_4$alkanoylamino, preferably hydrogen or halogen, and $R_8$ is hydrogen, halogen or phenoxy unsubstituted or substituted in the phenyl ring by halogen, $C_1$–$C_4$alkyl, $C_1$–$C_4$alkoxy or by $C_2$–$C_4$alkanoylamino, preferably hydrogen or phenoxy unsubstituted or substituted in the phenyl ring by halogen.

There is more especially used as red dye of formula (3) in the method for trichromatic dyeing or printing according to the invention a dye of formula (4)

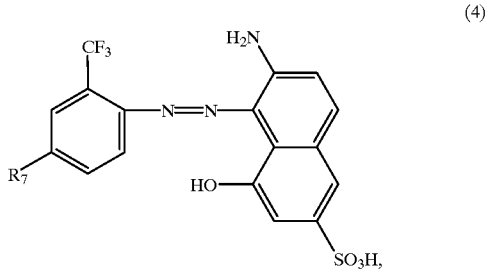

(4)

wherein $R_7$ is hydrogen or halogen.

There is preferably used as yellow or orange dye in the method for trichromatic dyeing or printing according to the invention at least one dye of formula (5) or (6)

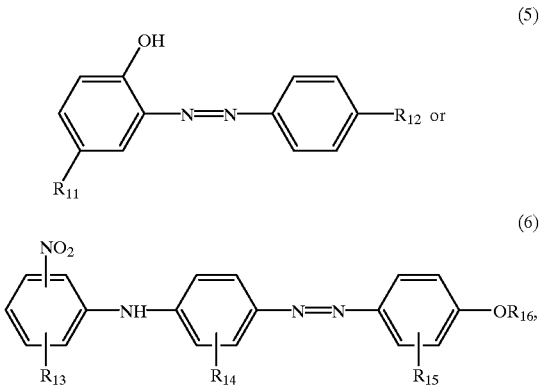

(5)

(6)

wherein $R_{11}$ is hydrogen, $C_1$–$C_4$alkyl or unsubstituted or substituted phenyl, and $R_{12}$ is $C_1$–$C_4$alkoxy unsubstituted or substituted in the alkyl moiety or is a 4,6-disubstituted N-(1,3,5-triazin-2-yl)amino or N-$C_1$–$C_4$alkyl-N-(1,3,5-triazin-2-yl)amino radical, $R_{13}$, $R_{14}$ and $R_{15}$ are each independently of the others hydrogen, $C_1$–$C_4$alkyl, $C_1$–$C_4$alkoxy, $C_2$–$C_4$alkanoylamino, halogen or sulfo, and $R_{16}$ is hydrogen, $C_1$–$C_4$alkyl or phenylsulfonyl unsubstituted or substituted in the phenyl ring.

The radical $R_{11}$ as phenyl is unsubstituted or substituted, for example, by $C_1$–$C_4$alkyl, for 5example methyl or ethyl; $C_1$–$C_4$alkoxy, for example methoxy or ethoxy; $C_2$–$C_4$alkanoylamino, for example acetylamino or propionylamino; hydroxy; sulfo or halogen, for example fluorine, chlorine or bromine.

As N-(1,3,5-triazin-2-yl)amino or N-$C_1$–$C_4$alkyl-N-(1,3,5-triazin-2-yl)amino there come into consideration for $R_{12}$ those radicals substituted in the 4- and 6-positions of the triazine ring, each independently of the other, for example, by halogen, for example fluorine or chlorine; hydroxy; $C_1$–$C_4$alkoxy, for example methoxy or ethoxy; $C_1$–$C_4$alkylthio, for example thiomethyl or thioethyl; amino; N-mono- or N,N-di-$C_1$–$C_4$alkylamino, each unsubstituted or substituted in the alkyl moiety by hydroxy, sulfo, sulfato, carboxy, $C_2$–$C_4$alkanoylamino or by $C_1$–$C_4$alkoxy, for example methylamino, ethylamino, 2-hydroxyethylamino, 2-methoxyethylamino, N-methyl-N-(2-sulfoethyl)amino, dimethylamino or diethylamino; $C_5$–$C_7$cycloalkylamino unsubstituted or substituted in the cycloalkyl ring by $C_1$–$C_4$alkyl, for example cyclohexylamino; phenylamino or N-$C_1$–$C_4$alkyl-N-phenylamino each unsubstituted or substituted in the phenyl ring by $C_1$–$C_4$alkyl, $C_1$–$C_4$alkoxy, carboxy, $C_2$–$C_4$alkanoylamino, sulfo or by halogen; morpholino or piperidin-1-yl.

Examples of $C_1$–$C_4$alkyl that come into consideration for $R_{11}$, $R_{13}$, $R_{14}$, $R_{15}$ and $R_{16}$, each independently of the others, are methyl, ethyl, propyl, isopropyl, n-butyl, isobutyl, sec-butyl and tert-butyl.

Examples of $C_1$–$C_4$alkoxy that come into consideration for $R_{12}$, $R_{13}$, $R_{14}$ and $R_{15}$, each independently of the others, are methoxy, ethoxy, propoxy, isopropoxy, n-butoxy, isobutoxy, sec-butoxy and tert-butoxy. The radical $R_{12}$ as $C_1$–$C_4$alkoxy may be substituted in the alkyl moiety, for example, by halogen, for example fluorine, chlorine or bromine; hydroxy; $C_1$–$C_4$alkoxy, for example methoxy or ethoxy; amino; N-mono-$C_1$–$C_4$alkylamino, for example methylamino or ethylamino; N,N-di-$C_1$–$C_4$alkylamino, for example dimethylamino or diethylamino; $C_2$–$C_4$alkanoylamino, for example acetylamino or propionylamino; carboxy; sulfo or sulfato. For $R_{12}$ as $C_1$–$C_4$alkoxy preference is given to the radicals substituted in the alkyl moiety, especially to the radicals substituted in the alkyl moiety by sulfato.

Examples of $C_2$–$C_4$alkanoylamino that come into consideration for $R_{13}$, $R_{14}$ and $R_{15}$, each independently of the others, are acetylamino, propionylamino and butyrylamino.

The radical $R_{16}$ as phenylsulfonyl is unsubstituted or, for example, substituted in the phenyl ring by $C_1$–$C_4$alkyl, for example methyl or ethyl; $C_1$–$C_4$alkoxy, for example methoxy or ethoxy; $C_2$–$C_4$alkanoylamino, for example acetylamino or propionylamino; hydroxy; sulfo or halogen, for example fluorine, chlorine or bromine.

There is more especially used as yellow or orange dye in the method for trichromatic dyeing or printing according to the invention at least one dye of formula (5) or (6), wherein $R_{11}$ is hydrogen, $C_1$–$C_4$alkyl or phenyl unsubstituted or substituted by $C_1$–$C_4$alkyl, $C_1$–$C_4$alkoxy or by halogen, $R_{12}$ is $C_1$–$C_4$alkoxy unsubstituted or substituted in the alkyl moiety by hydroxy or by sulfato or is a radical of formula

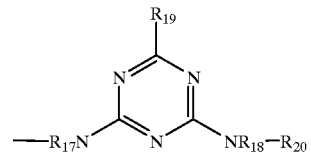

wherein $R_{17}$ and $R_{18}$ are each independently of the other hydrogen or $C_1$–$C_4$alkyl, $R_{19}$ is $C_1$–$C_4$alkoxy, hydroxy, halogen, amino or N-mono- or N,N-di-$C_1$–$C_4$alkylamino and $R_{20}$ is $C_1$–$C_4$alkyl unsubstituted or substituted by hydroxy, $C_1$–$C_4$alkoxy, $C_2$–$C_4$alkanoylamino, carboxy or by sulfo or is phenyl unsubstituted or substituted by halogen, $C_1$–$C_4$alkyl, $C_1$–$C_4$alkoxy, $C_2$–$C4$alkanoylamino or by sulfo;

$R_{13}$ and $R_{14}$ are each independently of the other hydrogen or sulfo, $R_{15}$ is hydrogen, $C_1-C_4$alkyl or $C_1-C_4$alkoxy, and $R_{16}$ is hydrogen or $C_1-C_4$alkyl.

Examples of $C_1-C_4$alkyl that come into consideration for $R_{17}$, $R_{18}$ and $R_{20}$, each independently of the others, are methyl, ethyl, propyl, isopropyl, n-butyl, isobutyl, sec-butyl and tert-butyl, preferably methyl and ethyl. $R_{17}$ and $R_{18}$ as $C_1-C_4$alkyl are more especially methyl. The radical $R_{20}$ as $C_1-C_4$alkyl may be substituted, for example, by hydroxy; $C_1-C_4$alkoxy, for example methoxy or ethoxy; $C_2-C_4$alkanoylamino, for example acetylamino or propionylamino; carboxy; sulfo or sulfato. For $R_{20}$ as $C_1-C_4$alkyl preference is given to the substituted radicals, especially to the sulfo-substituted radical.

Examples of $C_1-C_4$alkoxy that come into consideration for $R_{19}$ are methoxy, ethoxy, propoxy, isopropoxy, n-butoxy, isobutoxy, sec-butoxy and tert-butoxy, preferably methoxy and ethoxy.

Examples of N-mono- or N,N-di-$C_1-C_4$alkylamino that come into consideration for $R_{19}$ are methylamino, ethylamino, dimethylamino and diethylamino.

The radical $R_{20}$ as phenyl is unsubstituted or substituted, for example, by halogen, for example fluorine, chlorine or bromine; $C_1-C_4$alkyl, for example methyl or ethyl; $C_1-C_4$alkoxy, for example methoxy or ethoxy; $C_2-C_4$alkanoylamino, for example acetylamino or propionylamino; or sulfo. For $R_{20}$ as phenyl preference is given to the substituted radicals, especially to the sulfophenyl radical.

In an especially preferred embodiment of the method for trichromatic dyeing or printing according to the invention there is used as yellow or orange dye at least one dye of formula (5) wherein $R_{11}$ is hydrogen, $C_1-C_4$alkyl or phenyl, especially methyl or phenyl, $R_{12}$ is $C_1-C_4$alkoxy substituted in the alkyl moiety by sulfato, especially 2-sulfatoethoxy, or a radical of formula

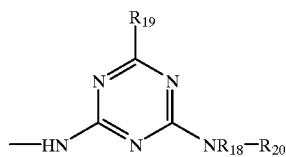

wherein $R_{18}$ is $C_1-C_4$alkyl especially methyl, $R_{19}$ is $C_1-C_4$alkoxy, especially methoxy, and $R_{20}$ is sulfo-substituted $C_1-C_4$alkyl, especially 2-sulfoethyl.

In a further especially preferred embodiment of the method for trichromatic dyeing or printing according to the invention there is used as yellow or orange dye of formula (6) at least one dye of formulae (7) and (8)

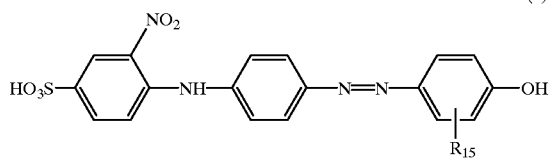

and

-continued

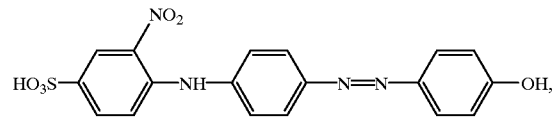

wherein $R_{15}$ is $C_1$–C4alkyl, especially methyl, preferably a dye mixture comprising at least one dye of formula (7) and a dye of formula (8) and especially a dye mixture comprising a dye of formula (7) wherein $R_{15}$ is bonded to the azo group in the ortho-position and is methyl, and a dye of formula (8).

A preferred embodiment of the method for trichromatic dyeing or printing according to the invention comprises using as red dye at least one dye of formula (3) wherein $R_6$ is halogen, trifluoromethyl or

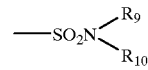

wherein $R_9$ is cyclohexyl and $R_{10}$ is methyl, $R_7$ is hydrogen or halogen, and $R_8$ is hydrogen or halo-substituted phenoxy;

as yellow or orange dyes at least one dye of formula (5) wherein $R_{11}$ is hydrogen, $C_1-C_4$alkyl or phenyl, especially methyl or phenyl, $R_{12}$ is $C_1-C_4$alkoxy substituted in the alkyl moiety by sulfato, especially 2-sulfatoethoxy, or a radical of formula

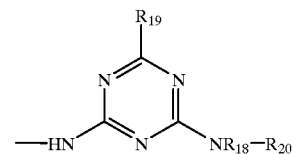

wherein $R_{18}$ is $C_1-C_4$alkyl, especially methyl, $R_{19}$ is $C_1-C_4$alkoxy, especially methoxy and $R_{20}$ is sulfo-substituted $C_1-C_4$alkyl, especially 2-sulfoethyl, or at least one dye of formulae (7) and (8) wherein $R_{15}$ is $C_1-C_4$alkyl, especially methyl; and a dye mixture comprising a dye of formula (1) together with a dye of formula (2) wherein $R_1$, $R_2$, $R_3$ and $R_4$ are hydrogen, and $R_5$ is $C_2-C_4$alkyl, especially ethyl.

An especially preferred embodiment of the method for trichromatic dyeing or printing according to the invention comprises using as red dye a dye of formula (4) wherein $R_7$ is hydrogen or halogen, and as yellow or orange dyes a dye mixture comprising a dye of formula (7) wherein $R_{15}$ is bonded to the azo group in the ortho-position and is methyl, and a dye of formula (8); and a dye mixture comprising a dye of formula (1) together with a dye of formula (2) wherein $R_1$, $R_2$, $R_3$ and $R_4$ are hydrogen and $R_5$ is ethyl.

The dyes used in the method for trichromatic dyeing or printing according to the invention are either in the form of their free sulfonic acid or, preferably, in the form of the salts thereof.

Suitable salts are, for example, the alkali, alkaline earth or ammonium salts or the salts of an organic amine. Examples that may be mentioned are the sodium, lithium, potassium and ammonium salts or the salt of mono-, di- or tri-ethanolamine.

The dyes used in the method according to the invention may comprise further additives, for example sodium chloride or dextrin.

The method for trichromatic dyeing or printing according to the invention can be applied to customary dyeing or printing methods. In addition to water and the dyes, the dye liquors or print pastes may comprise further additives, for example wetting agents, antifoams, levelling agents, or agents that influence the properties of the textile material, for example, softeners, additives for flame-resistance finishes or dirt-, water- and oil-repellants, and water-softeners and natural or synthetic thickeners, for example alginates and cellulose ethers.

The method for trichromatic dyeing or printing according to the invention is also suitable for dyeing from short liquors, for example in continuous dyeing methods or in batchwise or continuous foam dyeing methods.

The amounts in which the individual dyes are used in the dye baths or print pastes may vary within wide limits according to the desired depth of shade; generally, amounts of from 0.01 to 15% by weight, especially from 0.01 to 10% by weight, based on the dyestuff or print paste, have proved advantageous.

Dyeing is preferably carried out at a pH value of from 3 to 7, especially from 4 to 7. The liquor ratio can be selected within a broad range, for example from 1:5 to 1:50, preferably from 1:5 to 1:30. Dyeing is preferably carried out at a temperature of from 70 to 110° C., especially from 80 to 105° C.

The dyes used in the method according to the invention are distinguished in trchromatic dyeing or printing by uniform colour build-up, good uptake, good constancy of shade even in different concentrations, good fastness properties and solubility and, especially, very good combinability.

The method for trichromatic dyeing or printing according to the invention is suitable for dyeing or printing both natural polyamide materials, for example wool, and especially synthetic polyamide materials, for example polyamide 6 or polyamide 6.6, and is suitable for dyeing or printing wool and synthetic polyamide blend fabrics or yarns.

The textile material in question may be in a wide variety of processed forms, for example in the form of fibres, yarn, fabric or knitted goods, and especially in the form of carpets.

Level dyeings having good allround properties, especially good fastness to rubbing, to wetting, to wet rubbing and to light, are obtained.

The present invention relates also to concentrated aqueous dye solutions comprising from 5 to 50% by weight, especially from 10 to 50% by weight, preferably from 20 to 50% by weight, based on the total weight of the dye solution, of a dye mixture comprising at least one dye of formula (1) together with at least one dye of formula (2), the radicals $R_1$, $R_2$, $R_3$, $R_4$ and $R_5$ having the meanings and preferred meanings given above.

The concentrated aqueous dye solutions according to the invention may comprise further additives, for example urea, N-methylpyrrolidone, caprolactam or polyethylene glycol. The concentrated aqueous solutions according to the invention may also comprise substances that inhibit the growth of fungi and/or bacteria.

The dye solutions according to the invention exhibit good storage stability and are stable to storage for several months, for example, at a temperature of from −5 to +40° C.

The dye solutions according to the invention also exhibit good hard-water resistance and can be diluted with water in any desired ratio, for example for the preparation of the dye liquor, without precipitation of the dissolved dyes.

In the following Examples, parts are parts by weight. The temperatures are given in degrees Celsius. The relationship between parts by weight and parts by volume is the same as that between grams and cubic centimeters.

EXAMPLE 1

To prepare dye mixtures comprising one of the dyes that, in the form of the free acid, correspond to the compounds of formulae (101) and (102)

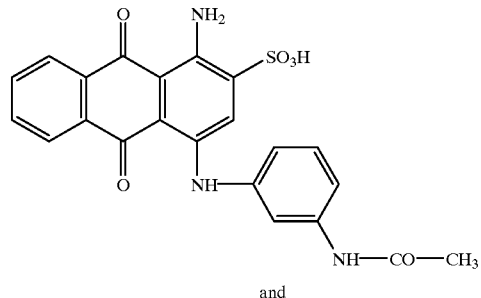

(101)

and

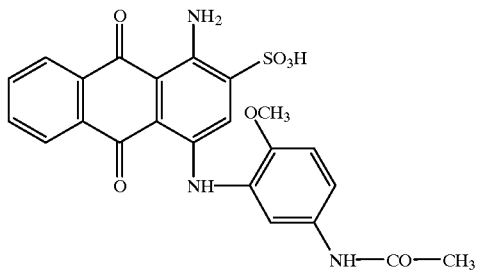

(102)

and a dye that, in the form of the free acid, corresponds to the compound of formula (103)

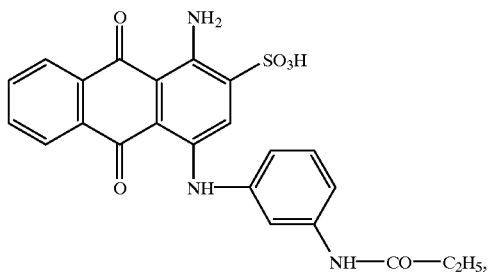

(103)

a) 50 parts of the dye of formula (101) and 50 parts of the dye of formula (103) are mixed homogeneously in a mixer and yield 100 parts of the mixture referred to hereinafter as dye mixture A;

b) 50 parts of the dye of formula (102) and 50 parts of the dye of formula (103) are mixed homogeneously in a mixer and yield 100 parts of the mixture referred to hereinafter as dye mixture B.

EXAMPLE 2

1 part of a levelling auxiliary (based on the condensation product of a higher aliphatic amine and ethylene oxide) is added at room temperature to 2000 parts of demineralised water. The bath is then adjusted to a pH value of 6 with 4 parts of sodium dihydrogen phosphate and 0.6 part of disodium hydrogen phosphate. A mixture of 0.11 part of a dye that, in the form of the free acid, corresponds to the compound of formula

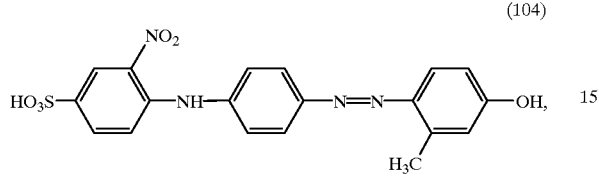
(104)

0.11 part of a dye that, in the form of the free acid, corresponds to the compound of formula

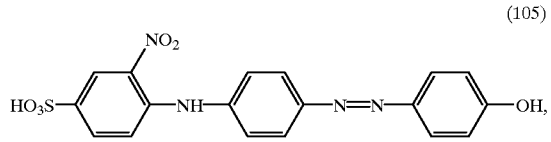
(105)

0.1 part of a dye that, in the form of the free acid, corresponds to the compound of formula

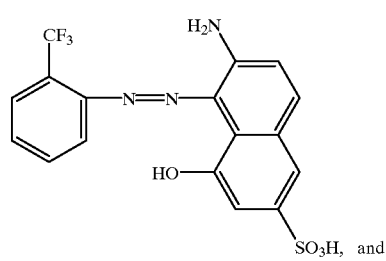
(106)

0.11 part of dye mixture A are then added thereto. 100 parts of polyamide 6.6 fibre material (helanca tricot) are then placed in the resulting dye solution and the dye bath is heated over the course of 45 minutes to a temperature of about 96° C. That temperature is maintained for from 45 to 60 minutes, the bath is then cooled to a temperature of 70° C. and the dyed material is removed, rinsed with water and then dried. A fabric dyed in a beige-brown shade is obtained.

EXAMPLE 3

By proceeding as indicated in Example 2, but using 0.11 part of dye mixture B instead of 0.11 part of dye mixture A, there is obtained polyamide fabric likewise dyed in a beige-brown shade.

EXAMPLES 4 and 5

By proceeding as indicated in Example 2 but, instead of using the 0.1 part of the red dye of formula (106), using 0.1 part of a dye mixture comprising 20 parts of a dye that, in the form of the free acid, corresponds to the compound of formula (107)

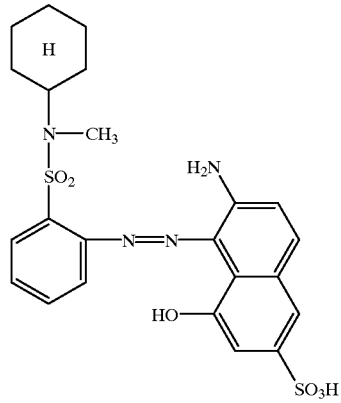
(107)

and 80 parts of a dye that, in the form of the free acid, corresponds to one of the compounds of the formulae given in Table 1, there is obtained polyamide fabric likewise dyed in a beige-brown shade.

TABLE 1

| Ex. | Dye | |
|---|---|---|
| 4 | ![structure] | (108) |
| 5 | ![structure] | (109) |

EXAMPLES 6 to 9

By proceeding as indicated in Example 2 but, instead of using the 0.1 part of the red dye of formula (106), using 0.1 part of a dye mixture comprising 80 parts of a dye that, in the form of the free acid, corresponds to the compound of formula (108) and 20 parts of a dye that, in the form of the free acid, corresponds to one of the compounds of the formulae given in Table 2, there is obtained polyamide fabric likewise dyed in a beige-brown shade.

TABLE 2

| Ex. | Dye | |
|---|---|---|
| 6 | (structure: cyclohexyl-N(C₂H₅)-SO₂-phenyl-N=N-naphthalene with H₂N, HO, SO₃H substituents) | (110) |
| 7 | (structure: azepane-N-SO₂-phenyl-N=N-naphthalene with H₂N, HO, SO₃H substituents) | (111) |

TABLE 2-continued

| Ex. | Dye | |
|---|---|---|
| 8 | (structure: H₃C—(CH₂)₃—N—(CH₂)₃—CH₃ on SO₂-phenyl-N=N-naphthalene with H₂N, HO, SO₃H) | (112) |
| 9 | (structure: CF₃ and H₃CCONH substituted phenyl-N=N-naphthalene with H₂N, HO, SO₃H) | (113) |

EXAMPLES 10 and 11

By proceeding as indicated in Example 2 but, instead of using the yellow dyes of formulae (104) and (105), using a dye that, in the form of the free acid, corresponds to one of the compounds of the formulae given in Table 3, there is obtained polyamide fabric likewise dyed in a beige-brown shade. Each of the dyes given in Table 3 below is used in an amount of 0.22 part, based on the fibre material to be dyed.

TABLE 3

| Ex. | Dye | |
|---|---|---|
| 10 | (structure: biphenyl with OH, N=N-phenyl-O-CH₂CH₂-O-SO₃H) | (114) |
| 11 | (structure: OH, H₃C-substituted phenyl-N=N-phenyl-NH-triazine(OCH₃)-N(CH₃)-CH₂CH₂-SO₃H) | (115) |

Preparation Example 880 parts of water are placed in a sulfonating flask and 382 parts of 1-amino-4-bromo-anthraquinone-2-sulfonic acid, 82 parts of 3-propionamido-aniline and 75 parts of 3-acetamido-aniline are added. After the addition of 201 parts of sodium hydrogen carbonate, the mixture is heated to a temperature of 75° C. 1 part of copper and 1 part of copper chloride are then added with constant stirring. After about 6 hours, the reaction is complete. 2180 parts of water and 345 parts of 32% HCl are added. Stirring is caried out at 80° C. for a further 30 minutes and the resulting product is auctioned off over a suction filter and then washed with a warm solution of 25 parts of HCl in 800 parts of water. 780 parts of a still wet product are obtained, which contains the dyes of formulae (101) and (103) in a ratio by weight of 50:50.

EXAMPLE 12

To prepare a concentrated aqueous solution of dyes of formulae (101) and (103), 28.5 parts of the wet product obtained in the Preparation Example are suspended in 31.1 parts of demineralised water. The paste is then neutralised with 10.1 parts of triethanolamine at a pH value of from 7 to 7.2. 30.0 parts of ε-caprolactam and 0.3 part of a commercially available bactericide are then added and the dye solution is clarified by filtration. The composition of this liquid formulation is as follows:

34.8% by weight of a mixture of the dyes of formulae (101) and (103) in the form of salts of triethanolamine, the ratio by weight of the dyes being as indicated above, 30.0% by we igh t aocaprolactam, 0.3% by weight of a commercially available bactericide, and 34.9% by weight water.

The resuting formulation is stable to storage at a temperature of from −5 to +40° C. and dyes polyamide fabrics in shades of blue.

EXAMPLE 13

1 part of a levelling auxiliary (based on the condensation product of a higher aliphatic amine and ethylene oxide) is added at room temperature to 2000 parts of demineralised water. The bath is then adjusted to a pH value of 6 with 4 parts of sodium dihydrogen phosphate and 0.6 part of disodium hydrogen phosphate. A mixture of 0.11 part of a dye that, in the form of the free acid, corresponds to the compound of formula (104), 0.11 part of a dye that, in the form of the free acid, corresponds to the compound of formula (105), 0.1 part of a dye that, in the form of the free acid, corresponds to the compound of formula

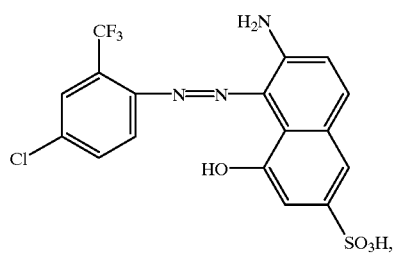

(108)

and 0.11 part of dye mixture A from Example 1 is then added. 100 parts of polyamide 6.6 fibre material (Helanca tricot) are then placed in the resulting dye solution and the dye bath is heated over the course of 45 minutes to a temperature of about 96° C. That temperature is maintained for from 45 to 60 minutes, the bath is then cooled to a temperature of 70° C. and the dyed material is removed, rinsed with water and then dried, yielding a fabric dyed in a beige-brown shade.

EXAMPLE 14

By proceeding as indicated in Example 13, but using 0.11 part of dye mixture B from Example 1 instead of 0.11 part of dye mixture A from Example 1, there is obtained polyamide fabric likewise dyed in a beige-brown shade.

Dyeing Procedure I 10 parts of polyamide 6.6 fabric are dyed in 500 parts of an aqueous liquor which contains 2 g/liter of ammonium acetate and is adjusted to pH 5 with acetic acid. The proportion of the liquid formulation according to Example 12 is 2%, based on the fibre weight. The dyeing time at a temperature of 98° C. is from 30 to 90 minutes. The dyed polyamide 6.6 fabric is then removed and washed and dried in the customary manner.

Dyeing Procedure II 10 parts of polyamide 6.6 fabric are dyed in 500 parts of an aqueous liquor which contains 1 g/liter of monosodium phosphate and is adjusted to pH 6 with disodium phosphate. The proportion of the liquid formulation according to Example 12 is 2%, based on the fibre weight. The dyeing time at a temperature of 98° C. is from 30 to 90 minutes. The dyed polyamide 6.6 fabric is then removed and washed and dried in the customary manner.

Dyeing Procedure III 10 parts of wool are dyed in 500 parts of an aqueous liquor. Based on the fibre weight, the liquor contains 2% of the liquid formulation according to Example 12, 5% of calcined Glauber's salt and 2% of 80% acetic acid. The dyeing time at a temperature of 98° C. is 30–60 minutes.

What is claimed is:

1. A dye mixture comprising at least one dye of formula (1)

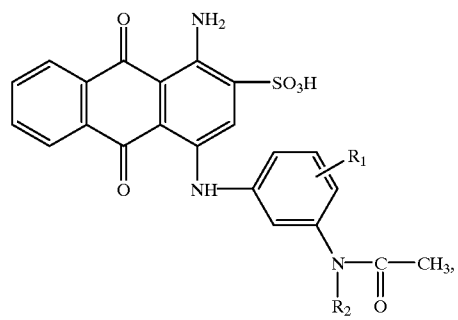

wherein $R_1$ is hydrogen, $C_1$–$C_4$alkyl or $C_1$–$C_4$alkoxy and $R_2$ is hydrogen or $C_1$–$C_4$alkyl, together with at least one dye of formula (2)

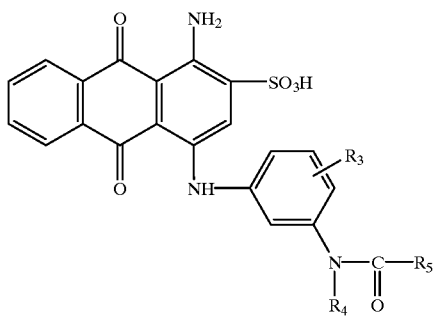

wherein

R₃ is hydrogen, $C_1$–$C_4$alkyl or $C_1$–$C_4$alkoxy, $R_4$ is hydrogen or $C_1$–$C_4$alkyl and $R_5$ is $C_2$–$C_6$alkyl uninterrupted or interrupted by oxygen, with the proviso that $R_1$ is not methyl when $R_2$, $R_3$ and $R_4$ are hydrogen and $R_5$ is ethyl.

2. A dye mixture according to claim 1, in which $R_1$ and $R_3$ are each independently of the other hydrogen, methyl or methoxy, $R_2$ and $R_4$ are hydrogen and $R_5$ is $C_2$–$C_4$alkyl.

3. A dye mixture according to claim 1, in which $R_1$, $R_2$, $R_3$ and $R_4$ are hydrogen and $R_5$ is ethyl.

4. A dye mixture according to claim 1 comprising from 5 to 95% by weight of a dye of formula (1), based on the total amount of the dyes of formula (1) and (2).

5. A method for dyeing or printing natural or synthetic polyamide fibre materials, which comprises contacting said materials with a dye mixture according to claim 1.

6. A method according to claim 5, wherein said dye mixture is used together with other dyes.

7. A method for trichromatic dyeing or printing natural or synthetic polyamide fibre materials, which comprises contacting said materials with a dye mixture according to claim 1 together with at least one red dye and at least one yellow or orange dye.

8. A method according to claim 7, which comprises using as red dye at least one dye of formula (3)

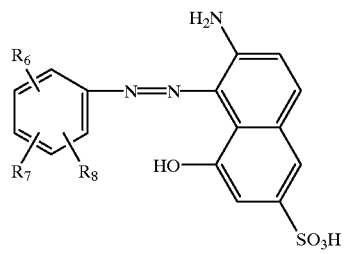

wherein $R_6$ is hydrogen; halogen; unsubstituted or substituted $C_1$–$C_8$alkyl; phenylsulfonyl or phenoxysulfonyl each unsubstituted or substituted in the phenyl ring by $C_1$–$C_4$alkyl; cyclohexyloxycarbonylamino; $C_2$–$C_4$alkanoylamino; benzoylamino unsubstituted or halo-substituted in the phenyl ring; or

wherein $R_9$ is $C_1$–$C_8$alkyl, or phenyl or cyclohexyl each unsubstituted or substituted by $C_1$–$C_4$alkyl, and $R_{10}$ is hydrogen or $C_1$–$C_8$alkyl, or the radicals $R_9$ and $R_{10}$ together with the nitrogen atom bonding them form an azepinyl ring, $R_7$ is hydrogen, halogen, $C_1$–$C_8$alkyl or $C_2$–$C_4$alkanoylamino and $R_8$ is hydrogen, halogen or unsubstituted or substituted phenoxy.

9. A method according to claim 8, in which $R_6$ is halogen, unsubstituted or halo-substituted $C_1$–$C_4$alkyl or

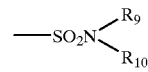

wherein $R_9$ is $C_1$–$C_4$alkyl, phenyl or cyclohexyl and $R_{10}$ is hydrogen or $C_1$–$C_4$alkyl, or the radicals $R_9$ and $R_{10}$ together with the nitrogen atom bonding them form an azepinyl ring, $R_7$ is hydrogen, halogen or $C_2$–$C_4$alkanoylamino and $R_8$ is hydrogen, halogen or phenoxy unsubstituted or substituted in the phenyl ring by halogen, $C_1$–$C_4$alkyl, $C_1$–$C_4$alkoxy or by $C_2$–$C_4$alkanoylamino.

10. A method according to claim 8, in which $R_6$ is halogen, trifluoromethyl or

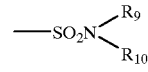

wherein $R_9$ is cyclohexyl and $R_{10}$ is methyl or ethyl, or the radical $R_9$ and $R_{10}$ together with the nitrogen atom bonding them form an azepinyl ring, $R_7$ is hydrogen or halogen and $R_8$ is hydrogen or phenoxy unsubstituted or halo-substituted in the phenyl ring.

11. A method according to claim 8, which comprises using as red dye of formula (3) a dye of formula (4)

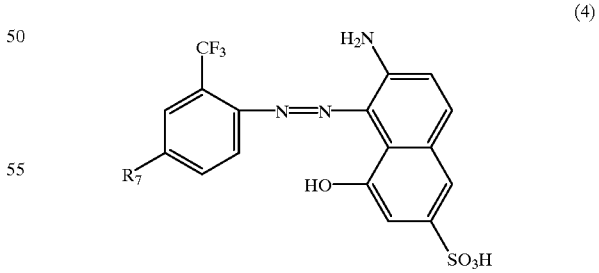

wherein $R_7$ is hydrogen or halogen.

12. A method according to claim 7, which comprises using as yellow or orange dye at least one dye of formula (5) or (6)

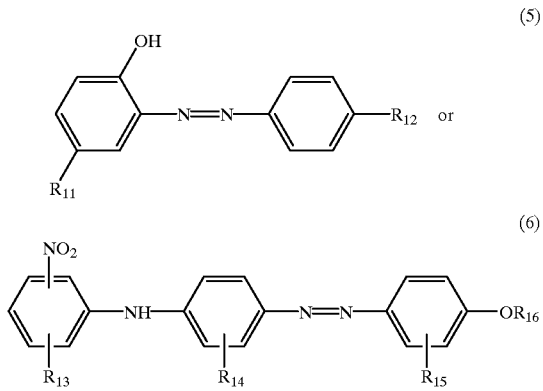

wherein

R$_1$, is hydrogen, C$_1$–C$_4$alkyl or unsubstituted or substituted phenyl, and R$_{12}$ is C$_1$–C$_4$alkoxy unsubstituted or substituted in the alkyl moiety or is a 4,6-disubstituted N-(1,3,5-triazin-2-yl)amino or N-C$_1$–C$_4$alkyl-N-(1,3,5-triazin-2-yl)amino radical, R$_{13}$, R$_{14}$ and R$_{15}$ are each independently of the others hydrogen, C$_1$–C$_4$alkyl, C$_1$–C$_4$alkoxy, C$_2$–C$_4$alkanoylamino, halogen or sulfo, and R$_{16}$ is hydrogen, C$_1$–C$_4$alkyl or phenylsulfonyl unsubstituted or substituted in the phenyl ring.

13. A method according to claim 12, in which R$_{11}$ is hydrogen, C$_1$–C$_4$alkyl or phenyl unsubstituted or substituted by C$_1$–C$_4$alkyl, C$_1$–C$_4$alkoxy or by halogen, R$_{12}$ is C$_1$–C$_4$alkoxy unsubstituted or substituted in the alkyl moiety by hydroxy or by sulfato or is a radical of formula

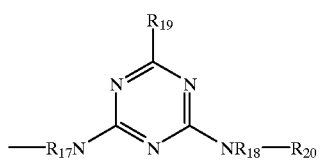

wherein R$_{17}$ and R$_{18}$ are each independently of the other hydrogen or C$_1$–C$_4$alkyl, R$_{19}$ is C$_1$–C$_4$alkoxy, hydroxy, halogen, amino or N-mono- or N,N-di-C$_1$–C$_4$alkylamino and R$_{20}$ is C$_1$–C$_4$alkyl unsubstituted or substituted by hydroxy, C$_1$–C$_4$alkoxy, C$_2$–C$_4$alkanoylamino, carboxy or by sulfo or is phenyl unsubstituted or substituted by halogen, C$_1$–C$_4$alkyl, C$_1$–C$_4$alkoxy, C$_2$–C$_4$alkanoylamino or by sulfo; R$_{13}$ and R$_{14}$ are each independently of the other hydrogen or sulfo, R$_{15}$ is hydrogen, C$_1$–C$_4$alkyl or C$_1$–C$_4$alkoxy and R$_{16}$ is hydrogen or C$_1$–C$_4$alkyl.

14. A method according to claim 12, which comprises using as yellow or orange dye at least one dye of formula (5) wherein R$_{11}$ is hydrogen, C$_1$–C$_4$alkyl or phenyl, R$_{12}$ is C$_1$–C$_4$alkoxy substituted in the alkyl moiety by sulfato, or a radical of formula

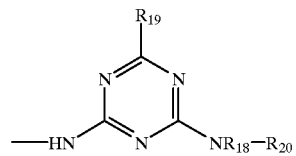

wherein R$_{18}$ is C$_1$–C$_4$alkyl, R$_{19}$ is C$_1$–C$_4$alkoxy, and R$_{20}$ is sulfo-substituted C$_1$–C$_4$-alkyl.

15. A method according to claim 12, which comprises using as yellow or orange dye of formula (6) at least one dye of formulae (7) and (8)

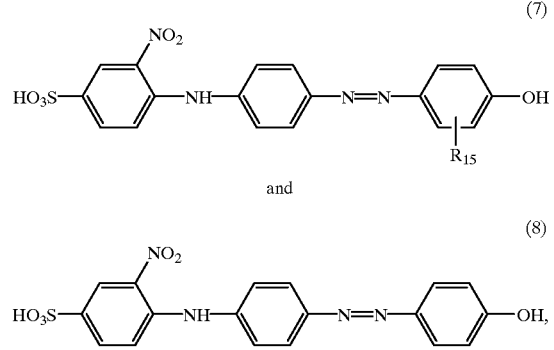

wherein

R$_{15}$ is C$_1$–C$_4$alkyl.

16. A method according to claim 5, which comprises dyeing or printing wool or synthetic polyamide fibre material.

17. A method according to claim 16, which comprises dyeing or printing synthetic polyamide fibre material.

18. A method according to claim 14, which comprises using as yellow or orange dye at least one dye of formula (5) wherein R$_{12}$ is C$_1$–C$_4$alkoxy substituted in the alkyl moiety by 2-sulfato-ethoxy, or a radical of formula

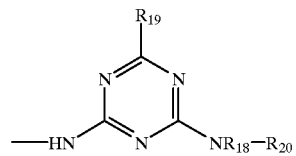

wherein R$_{18}$ is methyl, R$_{19}$ is methoxy, and R$_{20}$ is 2-sulfoethyl.

19. A concentrated aqueous dye solution comprising from 5 to 50% by weight, based on the total weight of the dye solution, of a dye mixture according to claim 1.

20. A dye mixture according to claim 4 comprising from 20 to 80% by weight of a dye of formula (1), based on the total amount of the dyes of formula (1) and (2).

* * * * *